United States Patent [19]

Coleman

[11] Patent Number: 4,465,537
[45] Date of Patent: Aug. 14, 1984

[54] METHOD OF MAKING A WOODEN WIND TURBINE BLADE

[75] Inventor: Clint Coleman, Warren, Vt.

[73] Assignee: North Wind Power Company, Inc., Moretown, Vt.

[21] Appl. No.: 379,631

[22] Filed: May 19, 1982

[51] Int. Cl.³ .............................................. B32B 31/16
[52] U.S. Cl. .................................... 156/154; 144/349; 144/350; 144/352; 156/222; 156/245; 416/229 R; 416/243
[58] Field of Search ............... 156/222, 223, 224, 245, 156/154, 580, 581, 583.1; 144/345, 346, 349, 350, 352; 416/229 R, 243

[56] References Cited

U.S. PATENT DOCUMENTS

| | | | |
|---|---|---|---|
| 1,378,776 | 5/1921 | Filippi | 416/229 |
| 2,155,375 | 4/1939 | Jablonski | 156/222 |
| 3,216,468 | 11/1965 | Allan | 156/222 |
| 3,277,938 | 10/1966 | Allan | 156/222 |
| 3,312,582 | 4/1967 | Allan et al. | 156/222 |

FOREIGN PATENT DOCUMENTS 158964 12/1980 Japan .................................. 156/154

OTHER PUBLICATIONS

*Wind Industry News Digest*, p. 6, Feb. 1982, (Along with Photocopy of Sample Product).
Faddoul, "Test Evaluation of a Laminated Wood Wind Turbine Blade Concept", May 1981, DOE/-NASA/20320-30 NASA TM-81719.

*Primary Examiner*—Caleb Weston
*Attorney, Agent, or Firm*—Kenway & Jenney

[57] ABSTRACT

A wooden wind turbine blade is formed by laminating wood veneer in a compression mold having the exact curvature needed for one side of the blade, following which the other side of the blade is ground flat along its length but twisted with respect to the blade axis.

5 Claims, 8 Drawing Figures

METHOD OF MAKING A WOODEN WIND TURBINE BLADE

BACKGROUND OF THE INVENTION

The Government has rights in this invention pursuant to Contract No. DE-AC04-76DP03533 awarded by the U.S. Department of Energy.

The invention relates generally to the manufacture of rotor blades and more particularly to the manufacture of a wind turbine blade with a flat bottom air foil.

Wind turbine blade design is critical to the overall performance, reliability and cost of modern wind energy conversion systems. The wind driven rotor typically comprises two or three radially extending blades connected at the center by a rotor hub which in turn is drivingly connected to an electrical generator or alternator. Thirty foot diameter rotor designs are capable of generating six kilowatts of electrical energy at moderate wind speeds. Each fifteen foot blade comprises a complex elongated geometry of flat twisted and convex surfaces. While wood is an excellent choice for this type of rotor blade because of its physical properties and absence of electrical interference, shaping techniques used in the past have relied on a variety of complex blade carving machines of the tracer type designed to carve both the top and bottom side of the air foil. These machines require small cutter widths and multiple passes to accurately carve an air foil. Thus, the machinery is not only expensive but labor intensive to use in the manufacturing process. Nevertheless, the resulting blades vary widely in stiffness, weight and strength characteristics from piece to piece. This variability, which can adversely affect rotor performance, results in a lower yield thus increasing the cost of an already costly process.

SUMMARY OF THE INVENTION

The general objective of the invention is to manufacture more uniform wooden wind turbine blades at lower cost.

These and other objects of the invention are achieved by a novel manufacturing process in which thin sheets of wood veneer are laminated in a compression mold having one side with the exact curvature needed for the complex convex side of the blade, following which the other side is ground flat but twisted along the length of the laminated blade by automated grinding machinery. The preferred process utilizes a drum sander. The twist distribution along the axis of the blades comes from warping the flat cut as it moves outward from the root to the tip of the blade. The only labor intensive steps are simple straight band-saw cuts, hole drilling and finishing of the laminated blade. The result is a blade with more uniform stress, weight and strength characteristics from piece to piece at a reduced manufacturing cost.

In the preferred process, melamine urea glue is applied to the flat surfaces of the veneer strips and while the veneer is compressed by an air bag press, the glue is hardened and cured by radio frequency heating.

DETAILED DESCRIPTION

The preferred manufacturing process is aimed at producing wind turbine rotor blades for a wind turbine of the type illustrated in U.S. Pat. No. 4,435,646 entitled "Wind Turbine Rotor Control System" assigned to the assignee of the present application and incorporated herein by reference. The preferred process of manufacture involves forming the curved laminate in a compression mold, removing the excess wood from the edges with a band saw, forming the twisted flat bottomed air foil with an automatic sanding machine, followed by the usual manual hand finishing and drilling of the completed blade.

Figure 1:
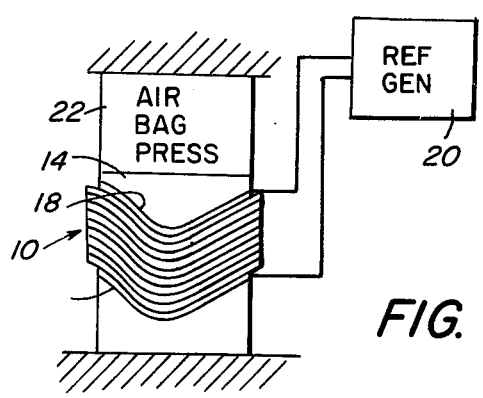
FIG. 1 is a schematic representation of the molding process.
Figure 2:
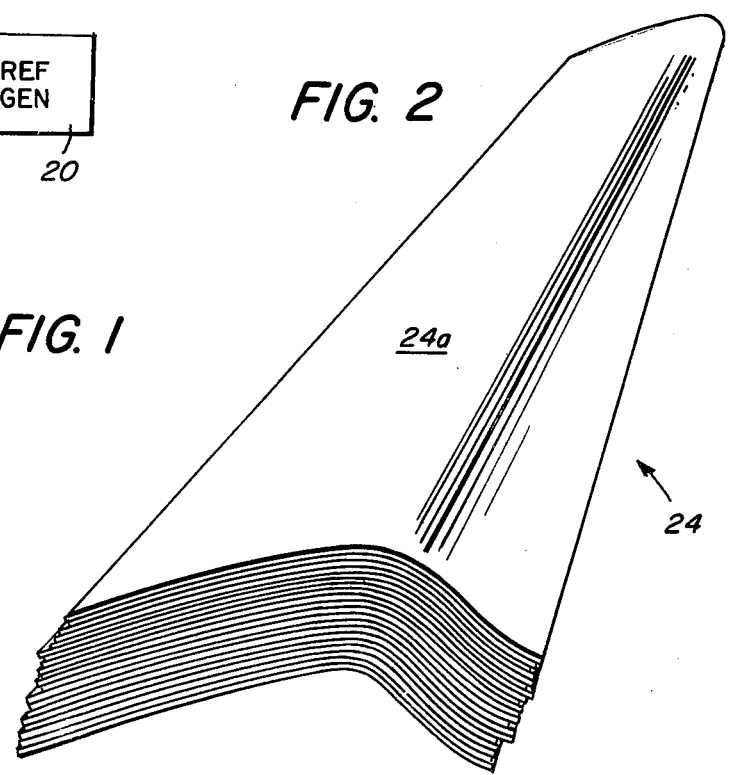
FIG. 2 is a perspective schematic view of the molded laminated blade blank.
Figure 8:
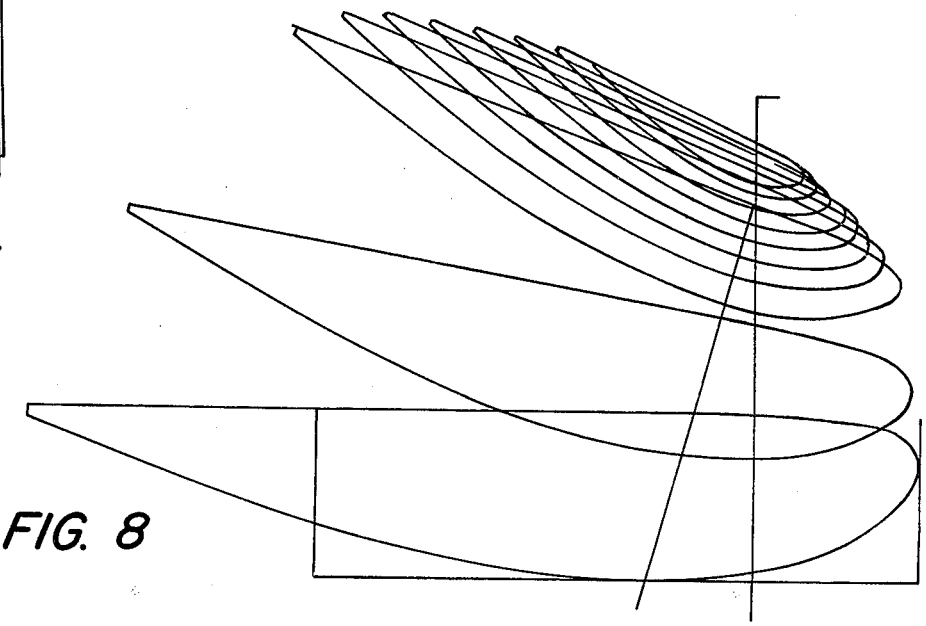
FIG. 8 is a blade section overlay schematic representation from tip to root illustrating the twist schedule.

FIG. 1 shows the molding process in which elongated rectangular sheets of 1/16" birch veneer 10 are wetted with adhesive by a conventional metered roller applicator (not shown) and stacked on the concave female part 12 of an elongated mold. When making a typical 15-foot blade, 32 sheets of veneer are required. The curvature of the surface of the female mold half 12 is designed to match the air foil curve shown, for example, in FIG. 8. This curved surface can be as complex as required. The upper mold half 14 carries a male molding surface which is approximately parallel to the female mold surface but is not critical in contour or dimension. The opposing faces of the mold halves 12 and 14 are lined or faced with respective thin flexible sheets of aluminum 16 and 18 as shown. Aluminum strips 16 and 18 are connected to a radio frequency generator 20. The upper mold half 14 is forced downward by an air bag press or hydraulic press, if desired, compressing the veneer layers. While compressed, the glue is heated and cured by radio frequency energy transmitted through the laminate by way of the aluminum strips 16 and 18. The resulting laminated blank 24 is illustrated in FIG. 2. The upper convex veneer surface 24A ultimately forms the curved side of the rotor blade. The remainder of the blank is machined as illustrated in FIGS. 3-5.

Figure 3:
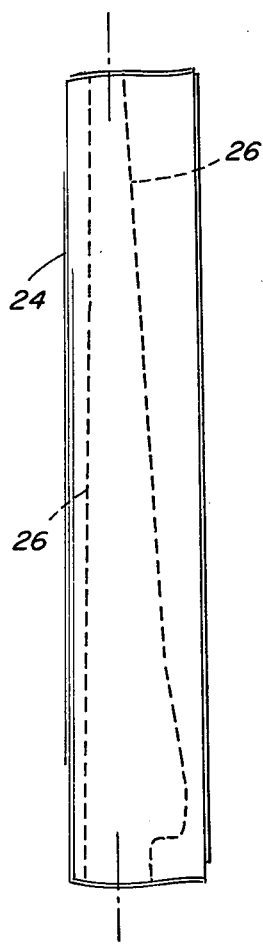
FIG. 3 is a plan view of the blank of FIG. 2 with trim lines indicated in dashed lines.

As shown in FIG. 3, the blank 24 is straight cut with a band-saw along the dashed lines 26 to define the contour of the edges of the rotor blade. This simple operation can be done by hand.

Figure 4:
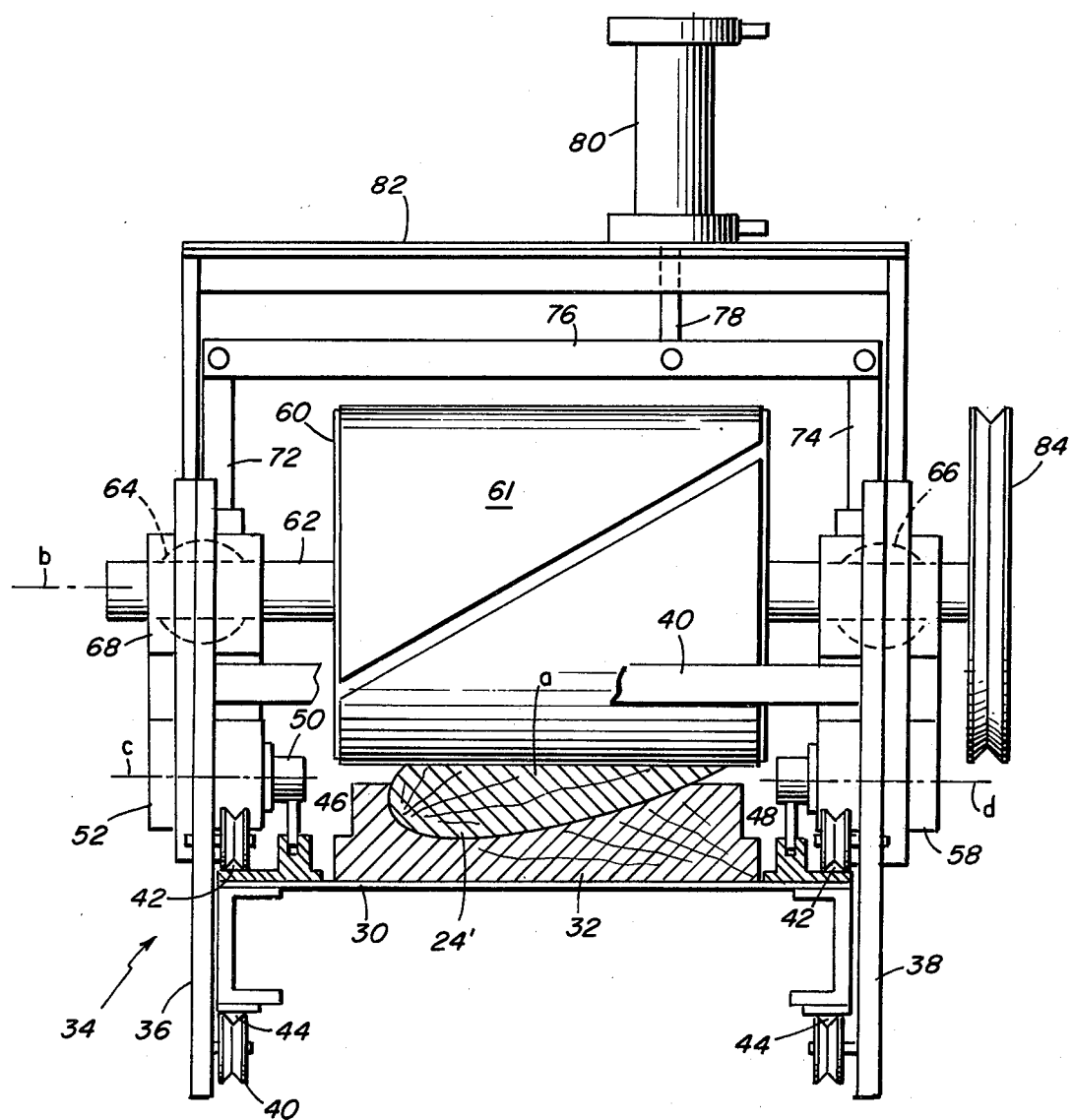
FIG. 4 is an end view of the automatic grinding apparatus.
Figure 5:
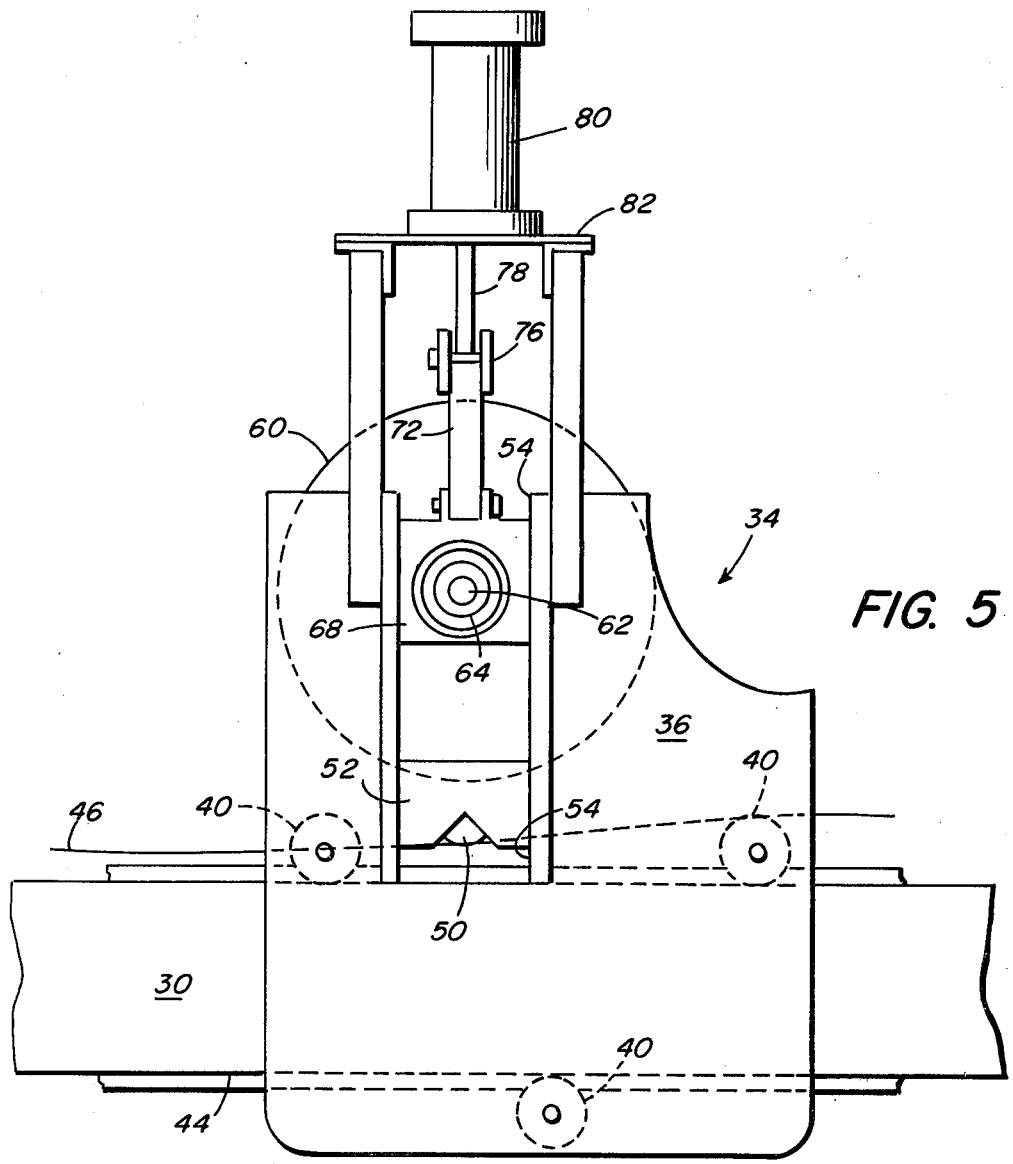
FIG. 5 is a side view of the apparatus of FIG. 4.

Next, the flat side of the rotor blade is machined by the apparatus shown in FIGS. 4 and 5. An elongated horizontal worktable 30 supports a wooden or preferably fiberglass jig 32 having a convex surface like that of the mold 12 comprising a long channel parallel to the length of the worktable 30, in which the blade blank 24' trimmed as shown in FIG. 3 is laid convex (good) side down. The blade axis a as used herein and shown in FIG. 3 is defined by the length of the blade from the larger root end which is connected to the rotor hub to the outboard tip of the blade. The object of the machinery shown in FIGS. 4 and 5 is to grind the upper surface of the blade blank 24' flat at a continuously varying angle with respect to the horizontal along the blade axis a, like the surface of a slightly twisted ribbon.

Figure 6:
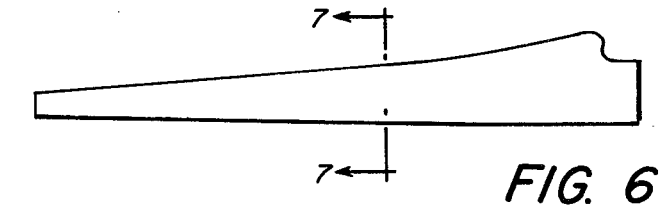
FIG. 6 is a plan view of the finished blade.

A wheeled carriage 34 includes a pair of metal plate side panels 36 and 38 rigidly interconnected by several crosspieces 40, only one of which is shown in FIG. 4 for illustration. Each side wall 36, 38 carries a set of three pulley wheels 40 which captively engage upper and lower V-rails 42 and 44 respectively mounted in parallel on both sides of the table 30 as shown in FIGS. 4 and 5. Between the jig 32 and upper V-rails 42 are a pair of linear guide or cam rails 46 and 48 extending along the length of the table 30 along either side of the blank jig 32. The upper flat surface of cam rail 46 with a curved profile, as shown in FIG. 6 is engaged by a roller 50 journaled in cam follower assembly 52 which is mounted for vertical translation in a slotted guideway 54 formed in the side panel 36. On the other side a similar roller 56 is journaled in cam follower 58 vertically slidably mounted in a similar guideway in the other side panel 38. Drum 60 is rigidly mounted on shaft 62 for coaxial rotation therewith. A sandpaper belt 61 is mounted on the drum surface. Drum shaft 62 is journaled in a pair of self-aligning bearings 64 and 66 in pillow blocks 68 and 70 respectively slidably mounted in the guideways of side panels 36 and 38 above the respective cam rail followers 52 and 58. The two pillow blocks 68 and 70 have rigid vertical extensions 72 and 74 which are pivotally interconnected by a yoke link 76 above the drum 60 parallel to the drum shaft 62. Link 76 is pivotally connected to the end of piston 78 of a pneumatic double acting cylinder 80 affixed to a rigid superstructure 82 supported by the side panels 36 and 38. The best location of the connection point of the piston 78 and yoke 76 can be determined by trial and error. The drum shaft 62 is rotated by means of pulley 84 mounted to the end of the drum shaft 62 extending out of the pillow block 70. Pulley 84 is belt-driven by a motor (not shown) mounted for travel with the carriage 34.

The pneumatic cylinder 80 acts as a spring applying constant force downward on the pillow blocks 68 and 70. When desired the cylinder can be used to raise the pillow blocks and the drum 60 from the work piece for inspection or replacement of the sandpaper belt 61. Because of the downward force acting on the pillow block 68 and 70 there need be no rigid link between the pillow block and its respective cam follower 52 or 58. Instead, by design, the pillow block and associated cam follower are movable with respect to each other to allow shims to be placed between them to adjust the height of the drum shaft 62 above the work piece 24'. Locomotion for the carriage 34 can be provided by an additional pneumatic or hydraulic cylinder and cable arrangement or any other appropriate means for rolling the carriage 34 along the carriage rails 42 and 44. In operation, the cam rails 46 and 48 cause elevation and tilting of the drum axis b in accordance with roller axes c and d, from the horizontal 72 as necessitated by the twist schedule of the flat-bottomed air foil as shown for example in FIG. 8.

Figure 7:
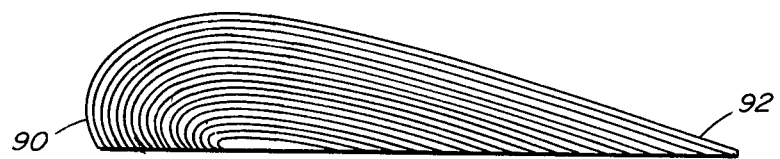
FIG. 7 is a cross-sectional view of the finished blade taken in lines 7—7 of FIG. 6.

As the carriage 34 travels down the length of the blade blank 24', excess wood is removed by the sandpaper 61 leaving behind a smooth surface like a twisted ribbon. The work is completed typically in several passes using sandpaper belts of the same or varying grade. Thus at any point along the blade axis a, the blade surface transverse to the axis is absolutely flat but angled with respect to the horizontal in accordance with the curved profile of the cam rails 46 and 48. The cross sectional view of the finished blade shown in FIG. 7 illustrates the unique construction of the resulting blade. Note that the convex surface of the blade is formed by a single sheet of veneer which was molded to that shape in the compression mold of FIG. 1. The other side of the blade is cut flat across the laminate.

To complete the blade, the leading and trailing edges 90 and 92 as shown in FIG. 7 are hand-sanded. Mounting holes are drilled in the blade root 94 of FIG. 6 and the blade is spray-coated with a polyurethane or other suitable finish.

The foregoing process retains all of the desirable aspects of wooden rotor blades made of inexpensive renewable available materials while minimizing the usual problems associated with finishing. The labor intensive carving process even using sophisticated tracing machinery has been eliminated resulting in substantial reduction in labor and machinery cost. An added bonus is derived from the fact that the volume of scrap wood in mass production is drastically reduced. The invention permits rough and finish carving operations to be designed completely as automatic molding and machining processes. The use of a single molded side and a flat twisted bottom formed by two guide rails permits an almost infinite variety of configurations to be automatically machined merely by changing one mold half and inserting custom guide rails. Thus the procedure is inherently adaptable to blades of a variety of lengths and sizes without sophisticated tracing machines. Moreover, the resulting laminated product has improved mechanical properties and reduced variability in stiffness and weight from piece to piece.

The foregoing detailed description is intended to be merely illustrative of the procedure and apparatus used in this process. Different types of molding equipment and adhesive systems may be used in place of the one described herein. While birch veneer is preferred, other types of wood may be found to be suitable. Only one implementation of the drum sanding machinery is shown in FIGS. 5 and 6. The details can be modified as needed. For example, the carriage 34 can be fixed and the work-piece along with the guide rails moved through the carriage. This equivalent relative motion between workpiece and carriage might well be preferable on larger workpieces requiring a larger drum and more horsepower. These and other variations of the illustrated process and machinery can be made by those skilled in the art without departing from the spirit or scope of the invention as defined by the appended claims and equivalents thereto.

What is claimed is:

1. A process for manufacturing a rotor blade comprising the steps of forming a concave mold matching a predetermined air foil surface contour, wetting a plurality of thin wood layers with adhesive, stacking a predetermined number of wetted layers of wood on the concave mold, applying uniform pressure to the top layer while bonding the wooden layers together into an elongated laminated blank having convex and concave sides, bringing a rotating abrasive drum having a drum axis into contact with the concave surface of the blade blank with the drum axis approximately perpendicular to the length of the blank, and forcing the abrasive drum against the blank while both advancing the drum axially along the length of the blank and also gradually varying the tilt angle of the drum axis relative to horizontal according to a predetermined twist schedule to form a flat-bottomed air foil.

2. The process of claim 1, wherein said step of applying uniform pressure to the top layer is accomplished by means of expanding an air bag press against the top layer.

3. The process of claim 1, wherein said adhesive is melamine urea.

4. The process of claim 1, wherein said adhesive is heated while pressure is being applied.

5. The process of claim 4, wherein said adhesive is melamine urea and said step of heating said adhesive is accomplished by radio frequency heating.

* * * * *